United States Patent
Gallagher et al.

(10) Patent No.: US 11,370,500 B2
(45) Date of Patent: Jun. 28, 2022

(54) POLYURETHANE WEAR PAD

(71) Applicant: Gallagher Corporation, Gurnee, IL (US)

(72) Inventors: Richard Gallagher, Lake Bluff, IL (US); Shaun Gosselin, Fox Lake, IL (US)

(73) Assignee: Gallagher Corporation, Gurnee, IL (US)

( * ) Notice: Subject to any disclaimer, the term of this patent is extended or adjusted under 35 U.S.C. 154(b) by 458 days.

(21) Appl. No.: 16/562,752

(22) Filed: Sep. 6, 2019

(65) Prior Publication Data

US 2020/0086936 A1 Mar. 19, 2020

Related U.S. Application Data

(60) Provisional application No. 62/732,320, filed on Sep. 17, 2018.

(51) Int. Cl.
*B62D 55/275* (2006.01)
*B62D 55/28* (2006.01)

(52) U.S. Cl.
CPC ........... *B62D 55/275* (2013.01); *B62D 55/28* (2013.01)

(58) Field of Classification Search
CPC .............................. B62D 55/275; B62D 55/28
See application file for complete search history.

(56) References Cited

U.S. PATENT DOCUMENTS

| | | | | |
|---|---|---|---|---|
| 3,058,783 A * | 10/1962 | Wadsworth | .......... | B62D 55/275 305/51 |
| 5,388,900 A * | 2/1995 | Suzuki | ................. | B62D 55/275 305/51 |
| 7,673,951 B2 * | 3/2010 | Chiang | .................. | B62D 55/28 305/201 |
| 7,731,306 B2 * | 6/2010 | Busley | ................. | B62D 55/275 305/189 |
| 8,011,739 B2 * | 9/2011 | Busley | ................. | B62D 55/275 305/189 |
| 2011/0148187 A1 * | 6/2011 | Lyons | .................... | B62D 55/28 305/189 |
| 2017/0305484 A1 * | 10/2017 | Chiang | .................. | B62D 55/28 |

FOREIGN PATENT DOCUMENTS

EP 0783009 A2 * 7/1997 ............. C08G 18/10
JP 57160776 A * 10/1982 ........... B62D 55/275

* cited by examiner

*Primary Examiner* — Jason R Bellinger
(74) *Attorney, Agent, or Firm* — Pierce Atwood LLP

(57) ABSTRACT

A wear pad that is adapted to be attached to a grouser plate of a track-type machine includes a polyurethane pad having a first surface region that is adapted to engage a contact patch between the polyurethane pad and a ground region, the first surface region having a first area. A reinforcing member is at least partially embedded within the polyurethane pad and has a second surface region that faces the first surface region, wherein a second area of the second surface region is greater than fifty percent of the first area.

23 Claims, 4 Drawing Sheets

SECTION B-B

SECTION A-A

DETAIL D

SECTION C-C

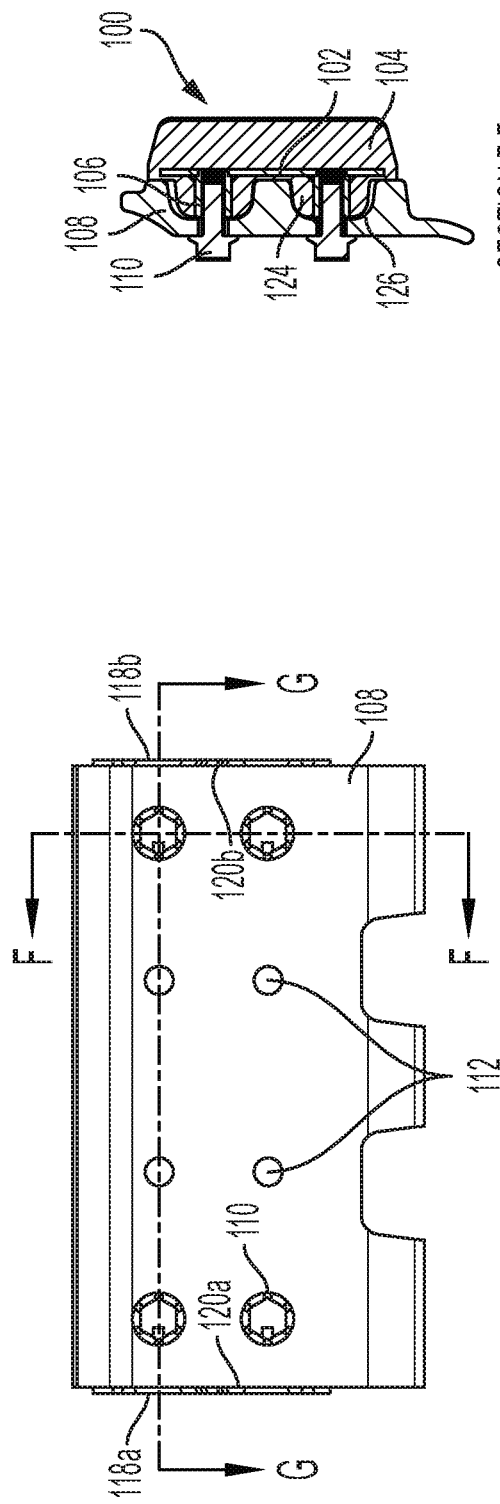
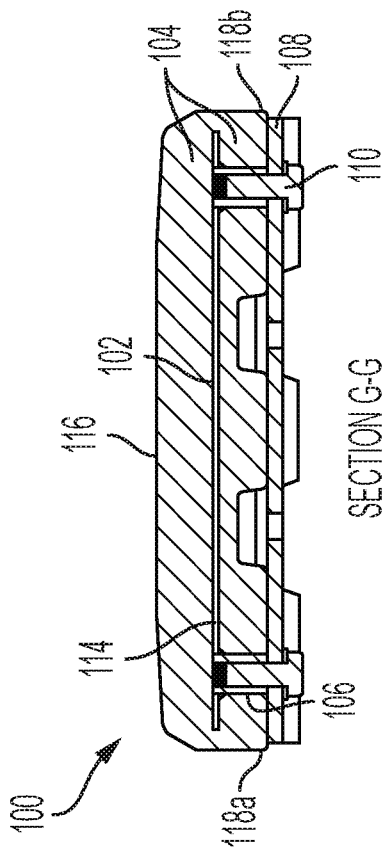
FIG. 4A
FIG. 4B
SECTION F-F
FIG. 4C
SECTION G-G

POLYURETHANE WEAR PAD

CROSS-REFERENCE TO RELATED APPLICATIONS

This application claims the benefit under 35 U.S.C. § 119(e) of U.S. Provisional Application Ser. No. 62/732,320, entitled POLYURETHANE WEAR PAD, filed Sep. 17, 2018, the entire contents of which are incorporated herein by reference for all purposes.

BACKGROUND

Road construction and maintenance vehicles that utilize steel tracks for movement often use replaceable wear pads to protect roadways from damage. These wear pads often consist of thermoset polyurethane chemically and/or mechanically bonded to steel reinforcement members embedded within the pad. The wear pad is attached to the steel grouser plates of the machine with mechanical fasteners such as bolts. The bolts pass through holes in the grouser plates and fasten to the steel reinforcement members embedded within the wear pad. When a wear pad reaches the end of its useful life, the wear pad can be replaced, and the original grouser plate of the vehicle is reused.

SUMMARY

In some embodiments, a wear pad adapted to be attached to a grouser plate for a track-type machine comprises a polyurethane pad, a reinforcing member, and at least one first fastener. The polyurethane pad has a first surface region that is adapted to engage a contact patch between the polyurethane pad and a ground region underneath the machine, the first surface region having a first area. The reinforcing member is at least partially embedded within the polyurethane pad and has a second surface region that faces the first surface region and to which polyurethane of the polyurethane pad is bonded, wherein a second area of the second surface region is greater than fifty percent of the first area. The at least one first fastener is associated with the reinforcing member and is adapted to engage at least one second fastener associated with the grouser plate so as to secure the wear pad to the grouser plate.

In some embodiments, a method of making a wear pad adapted to be attached to a grouser plate for a track-type machine involves securing a reinforcing member within a mold cavity corresponding to a desired shape of the wear pad. The desired shape has a first surface region that is adapted to engage a contact patch between the polyurethane pad and a ground region underneath the machine, the first surface region having a first area. The reinforcing member is secured within the mold cavity such that a second surface region of the reinforcing member faces the first surface region and such that a second area of the second surface region is greater than fifty percent of the first area. A liquid polyurethane is introduced into the mold cavity, and the liquid polyurethane is cured to form a solid polyurethane that is bonded to the second surface region.

BRIEF DESCRIPTION OF THE DRAWINGS

FIG. 4A is a plan view of the bottom of a second example apparatus in which a wear pad is attached to a grouser plate in accordance with some embodiments;

FIG. 4B is a cross-sectional view taken along the plane F-F shown in FIG. 4A; and FIG. 4C is a cross-sectional view taken along the plane G-G shown in FIG. 4A.

DETAILED DESCRIPTION

Figure 1B:
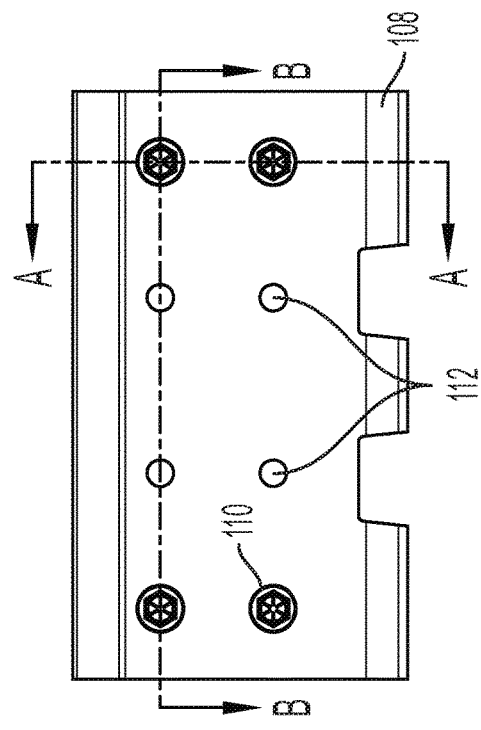
FIG. 1B is a plan view of the bottom of the first example apparatus shown in FIG. 1A.
Figure 1D:
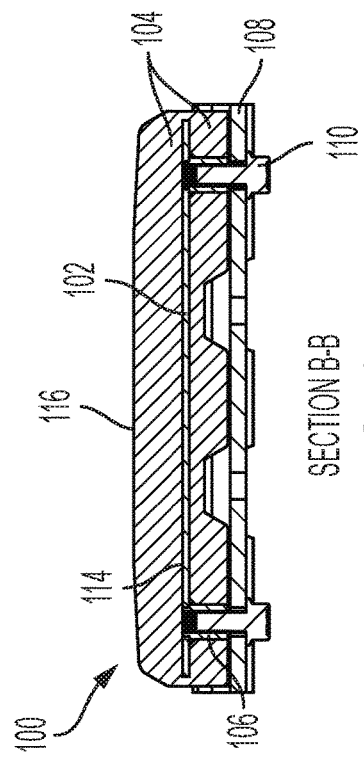
FIG. 1D is a cross-sectional view taken along the plane B-B shown in FIG. 1B.
Figure 1A:
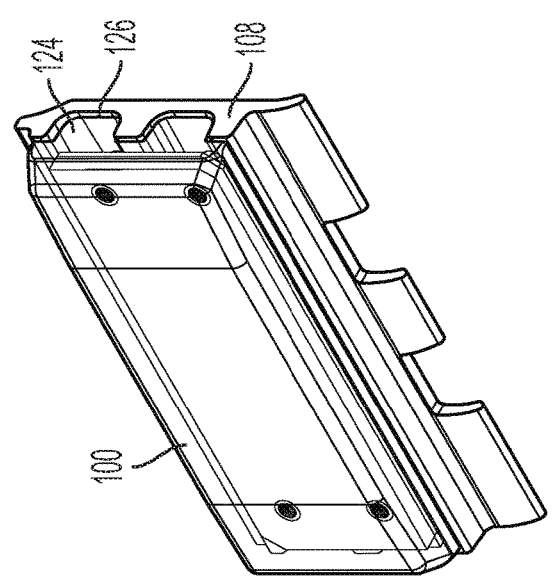
FIG. 1A is perspective view of a first example apparatus in which a wear pad is attached to a grouser plate in accordance with some embodiments.
Figure 1C:
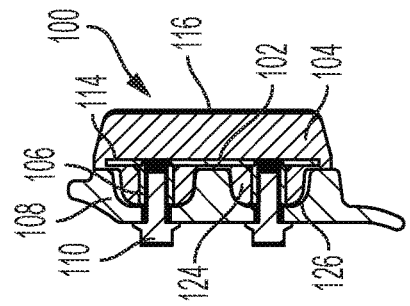
FIG. 1C is a cross-sectional view taken along the plane A-A shown in FIG. 1B.
Figure 2B:
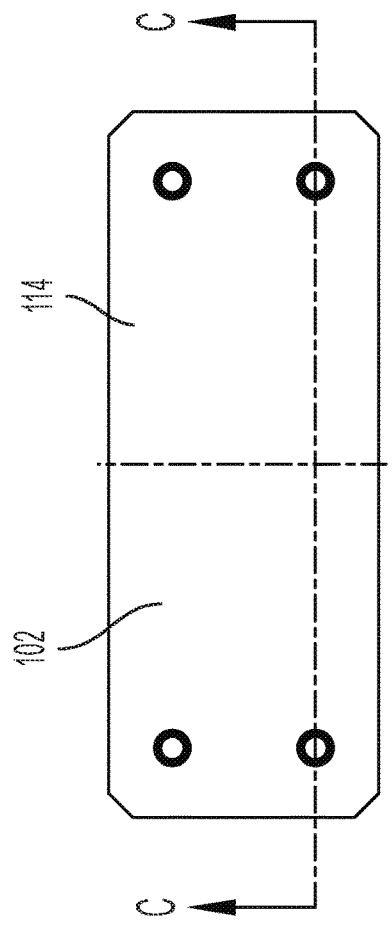
FIG. 2B is a plan view of the top of the example reinforcing member shown in FIG. 2A.
Figure 2D:
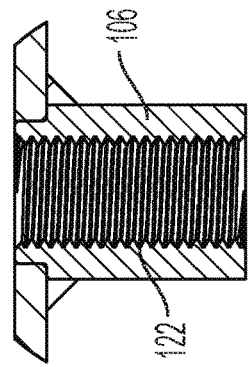
FIG. 2D is a detailed view of region D shown in FIG. 2C.
Figure 2A:
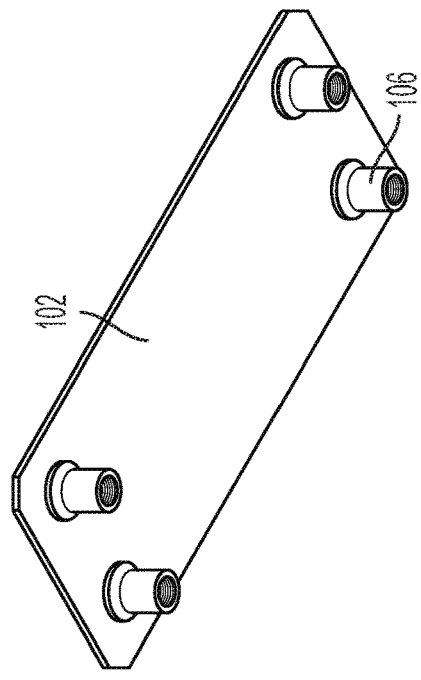
FIG. 2A is perspective view of an example reinforcing member in accordance with some embodiments.
Figure 2C:
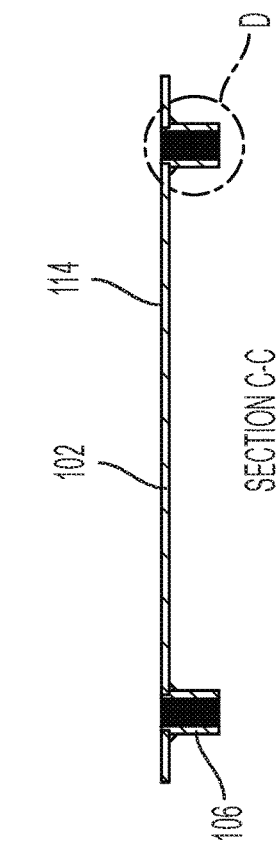
FIG. 2C is a cross-sectional view taken along the plane C-C shown in FIG. 2B.
Figure 3B:
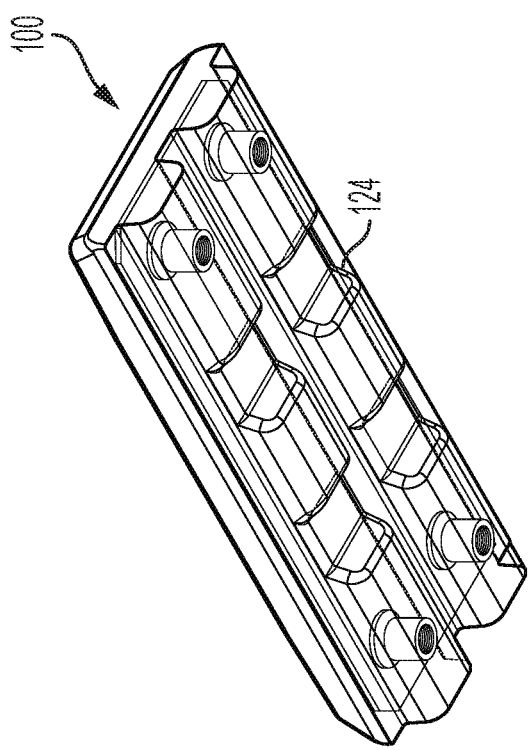
FIG. 3B is a second, inverted perspective view of the example wear pad shown in FIG. 3A.
Figure 3D:
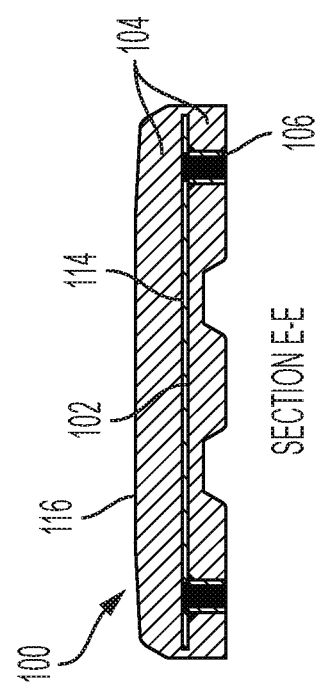
FIG. 3D is a cross-sectional view taken along the plane E-E shown in FIG. 3C.
Figure 3A:
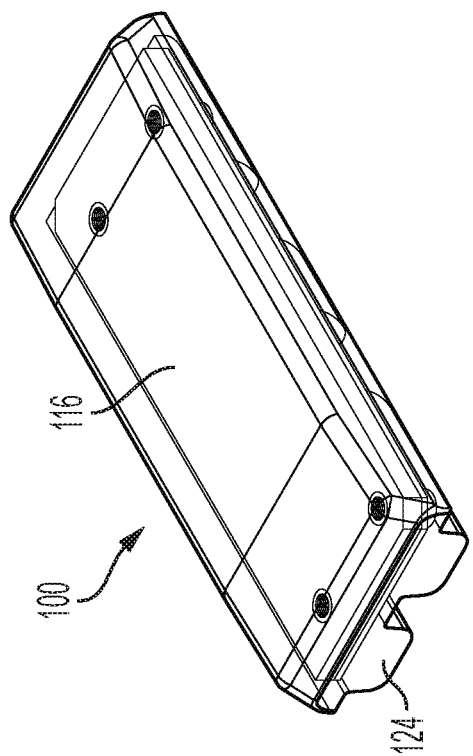
FIG. 3A is a first perspective view of an example wear pad in accordance with some embodiments.
Figure 3C:
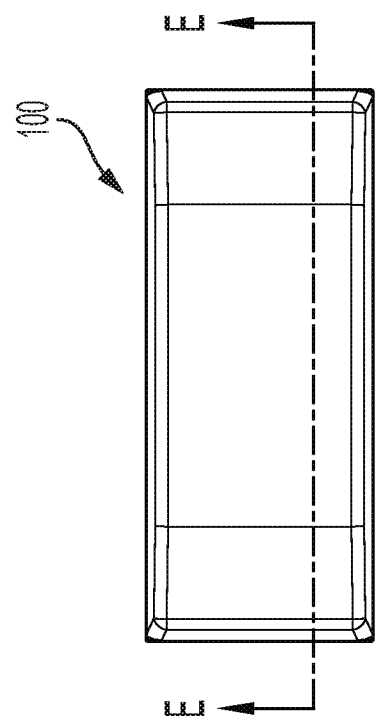
FIG. 3C is a plan view of the top of the example wear pad shown in FIGS. 3A and 3B.

The inventors have recognized and appreciated a deficiency in current bolt-on wear pad designs that allows for localized areas of high tensile strain when the pad is subjected to shear forces during tractive effort, including turning, by the machine. This deficiency stems from the fact that in current designs a very small portion of the polyurethane wear pad material is bonded, either chemically or mechanically, to the steel reinforcement members. Polyurethane, like other elastomers, tears more easily when strained in tension. The localized areas of high tensile strain may quickly develop cracks. As more and more cracks develop, the overall rigidity of the polyurethane wear pad may be diminished, which can lead to additional areas where high strains develop. Ultimately, these conditions can lead to premature failure of the polyurethane wear pad.

Thermoset polyurethane is a widely customizable engineering material for which certain physical properties, such as modulus, resilience and tear strength, can be altered through chemical manipulation. Thermoset polyurethanes may be cast as a liquid into a mold and then cured into an elastomer following a chemical reaction, which may be catalyzed by elevated temperature. The polyurethane used in the wear pads disclosed may be customized to have a high resistance to tearing and to have the correct modulus to allow smooth and efficient operation by the machine. Generally, with polyurethane elastomers, the static and dynamic coefficient of friction is directly relatable to the modulus of the material. For example, a lower modulus material will tend to have have a higher coefficient of static and dynamic friction than a higher modulus material.

Example embodiments of wear pads 100 capable of overcoming the above-noted problems are shown in FIGS. 1A-D, 2A-D, 3A-D, and 4A-C. As shown in FIGS. 1A-D and 4A-C, in some embodiments, the wear pad 100 may be configured to interface with and be fastened to a grouser plate 108, e.g., using one or more bolts 110. To interface with the grouser plate 108, the wear pad 100 may include one or more projections 124 that mate with corresponding cavities 126 of the grouser plate 108, and vice versa. In the embodiments shown, a single reinforcing member 102 is embedded into polyurethane 104 of the wear pad 100. In some embodiments, the reinforcing member 102 may not only be embedded into the polyurethane 104 of the wear pad, but may also be securely attached to the polyurethane 104 at the interface by means of a chemical bond. In some implementations, for example, a chemical bond may be formed between a polyurethane elastomer and the reinforcing member 102 using a chemical primer. In some embodiments, steps may be taken to prepare the reinforcing member 102 prior to applying the chemical primer. Such preparation may, for example, involve thoroughly cleaning and media blasting the surface of the reinforcing member 102. The chemical primer may thereafter be applied and cured onto the surface of the reinforcing member 102. Examples of suitable chemical primers that may be used for this purpose include: (1) Chemlok 213, available from Lord Corporation of Cary, N.C., (2) Conap AD-1147-C, available from Elantas PDG Inc. of St. Louis, Mo., and (3) Cilbond 49SF, available from H.B. Fuller of St. Paul, Minn.

The reinforcing member 102 may cleaned of any surface or subsurface contaminants using any of a number of techniques. In some implementations, for example, surface contaminates may be removed by applying alkaline detergents and aqueous rinsing. In other implementations, surface contaminants may additionally or alternatively be removed or immobilized by heat soaks at elevated temperatures to chemically deteriorate oils and other contaminates beneath the surface.

After the reinforcing member 102 has been properly cleaned, the surface may be abraded, for example, by media blasting the surface to remove oxidation, and increase surface area, which creates an active anchor pattern to which the chemical primer may adhere. After the chemical primer has been applied to the surface of the reinforcing member 102, the reinforcing member 102 may be heated and held at a prescribed temperature for a prescribed period to promote the chemical primer's adherence to the surface of the reinforcing member 102.

To form the wear pad 100, the chemical primer coated reinforcing member 102 may be secured into a mold cavity corresponding to the desired shape for the wear pad 100. The polyurethane 104 may be introduced into the mold cavity in liquid form. As the liquid polyurethane fully engulfs the reinforcing member 102, it may chemically react and bind with the chemical primer on the surface of the reinforcing member 102. Once the liquid polyurethane has fully reacted and phase changed from liquid to solid, the reinforcing member 102 may be permanently attached to the polyurethane 104 of the wear pad 100.

The singular reinforcing member 102 in the illustrated embodiment may substantially increase the bonded area of the polyurethane 104 and reduce localized areas of high strain when the wear pad 100 is subjected to shear forces caused by the tractive effort, including turning, of the machine. A uniform thickness of polyurethane bonded to the reinforcing member 102 on the ground side of the wear pad 100 may limit the amount of strain energy in the polyurethane 104 volume on the ground side. Limiting the maximum local strain and the strain energy may decrease the propagation of any cuts or tears in the polyurethane 104.

With current bolt-on wear pad designs, the bonded surface area of the embedded metal inserts is typically substantially less than 50% of the surface area of the contact patch between the wear pad 100 and the ground. By contrast, wear pads made in accordance with this disclosure can instead have a bonded surface area of one or more embedded metal inserts that is substantially greater than 50% of the surface area of the contact patch between the wear pad and the ground. In the embodiment shown in FIGS. 1A-D, 2A-D, 3A-D, and 4A-C, for example, the bonded surface area of the single embedded metal insert (i.e., the reinforcing member 102) is 86% of the surface area of the contact patch between the wear pad 100 and the ground. This percentage may be calculated, for example, by dividing the area of a face 114 of the reinforcing member 102 which is substantially parallel to and faces the ground, by the surface area of a face 116 of the polyurethane 104 of the wear pad 100 which contacts the ground. In other embodiments, the bonded surface area of the embedded metal insert(s) 102 can be greater than 60%, or greater than 70%, or greater than 80% of the surface area of the contact patch between the wear pad and the ground.

In some embodiments, the wear pad 100 may be sized appropriately such that one or more regions of the polyurethane 104 extend past one or both of the short edges of a rectangular grouser. An example of such an embodiment is shown in FIGS. 4A-C. As shown, in that embodiment, regions 118a, 118b of the polyurethane 104 extend past the short edges 120a, 120b of a grouser plate 108. In such embodiments, the reinforcing member 102 may also be sized appropriately to adequately reinforce the regions 118a, 118b of the polyurethane 104 extending past the short edges 120a, 120b of the rectangular grouser 108. Providing region (s) of polyurethane 104 that extend past the short edge(s) of the rectangular grouser plate 108 may, for example, protect curbing, roadways and other installations adjacent to the equipment operating with the wear pads 100.

In some embodiments, the polyurethane 104 of the wear pad 100 may be a "hot-castable" polyurethane. In other embodiments, the polyurethane may be a room temperature curable polyurethane, an injection moldable thermoplastic polyurethane, or a reaction injection moldable polyurethane. Hot-castable polyurethanes generally include two or three components which are manipulated and put into molds in liquid form and then cured in the presence of heat to phase change into a solid elastomeric material. A two-part polyurethane includes a resin and a curative, which when combined begin to cure. With two-part polyurethanes, there is a limited amount of working time available once the resin and curative have been mixed together.

In some embodiments, the polyurethane 104 of the wear pad 100 may include an MDI polyurethane, a TDI polyurethane, or a PPDI polyurethane. An MDI polyurethane includes methylene diphenyl diisocyanate reacted with a polyester or polyether polyol. In some implementations, 1,4 butanediol may be employed as a chain extender to cure an MDI-based polyurethane. In other implementations, other diols may additionally or alternatively be used as a chain extender. A TDI polyurethane includes toluene diisocyanate reacted with a polyester or polyether polyol. In some implementations, 4,4' methylenebis (2-chloroaniline) may be employed as a chain extender to cure a TDI-based polyurethane. In other implementations, other diamines, such as dimethylthiotoluenediamine or dethylene bis (2,6-diethyl-3-chloroaniline), may additionally or alternatively be used as a chain extender. A PPDI polyurethane includes p-phenylenediisocyanate reacted with a polyester or polyether polyol. In some implementations, 1,4 butanediol may be employed as a chain extender to cure a PPDI-based polyurethane. In other implementations, other diols may additionally or alternatively be used as a chain extender. For MDI-based, TDI-based, or PPDI-based polyurethanes, additives may also be added to the polyurethane compound in order to tailor select polyurethane material properties. For example, additives such as internal lubricants may be added to increase the sliding abrasion resistance of the polyurethane 104 of the wear pad 100.

As shown, in some embodiments, the reinforcing member 102 may include threaded stand-offs 106 embedded within the wear pad 100. As illustrated in FIGS. 1A-D and 4A-D, the threaded stand-offs 106 may be used for fastening the wear pad 100 to the grouser plate 108 of the machine using bolts 110. The stand-offs 106 may, for example, be welded to the reinforcing member 102. In some embodiments, threaded engagement regions of the stand-offs 106, e.g., threaded engagement region 122 shown in FIG. 2D, which are responsible for attaching the wear pad 100 to the machine, may be kept internal to the wear pad 100. By doing this, the threads may be protected from debris, common to a road construction environment. This may, for example, aid in pad removal at the end of the wear pad's life. As shown in FIGS. 1B and 4A, in some embodiments, the reinforcing member 102 may have additional holes 112 formed through its surface to improve the flow of polyurethane during the casting process.

The stand-offs 106 on the reinforcing member 102 of the wear pad 100 may, for example, be threaded in a secondary machining operation after the polyurethane 104 is molded. This may be done to prevent any polyurethane 104 from contaminating the internal threads during the molding operation, which contamination could prevent the threads from working properly.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A wear pad adapted to be attached to a grouser plate for a track-type machine, comprising:
   a polyurethane pad having:
      a first surface region that is adapted to engage a contact patch between the polyurethane pad and a ground region underneath the track-type machine, the first surface region having a first area, and
      a second surface region that is adapted to engage the grouser plate;
   a reinforcing member at least partially embedded within the polyurethane pad, the reinforcing member having:
      a third surface region on a first side of the reinforcing member, wherein the third surface region faces the first surface region, the third surface region is in contact with polyurethane of the polyurethane pad, and a second area of the third surface region is greater than sixty percent of the first area, and
      a fourth surface region on a second side of the reinforcing member opposite the first side, wherein the fourth surface region is in contact with the polyurethane of the polyurethane pad; and
   at least one first fastener associated with the reinforcing member and adapted to engage at least one second fastener associated with the grouser plate so as to secure the second surface region of the wear pad to the grouser plate.

2. The wear pad of claim 1, wherein the second area is greater than seventy percent of the first area.

3. The wear pad of claim 1, wherein the second area is greater than eighty percent of the first area.

4. The wear pad of claim 1, wherein the at least one first fastener comprises at least one threaded stand-off fixedly attached to the reinforcing member and at least partially embedded within the polyurethane of the polyurethane pad.

5. The wear pad of claim 1, in combination with the grouser plate, wherein:
   the grouser plate has a first edge and a second edge that is shorter than the first edge, and
   at least one region of the polyurethane pad extends past the second edge.

6. The wear pad of claim 1, wherein a thickness of the polyurethane between the first surface region and the third surface region is substantially uniform.

7. The wear pad of claim 1, wherein the polyurethane of the polyurethane pad is bonded to at least one of the third surface region or the fourth surface region.

8. The wear pad of claim 1, wherein the polyurethane of the polyurethane pad is bonded to each of the third surface region and the fourth surface region.

9. The wear pad of claim 1, wherein the polyurethane of the polyurethane pad is chemically bonded to at least one of the third surface region or the fourth surface region.

10. The wear pad of claim 1, wherein the polyurethane of the polyurethane pad is chemically bonded to each of the third surface region and the fourth surface region.

11. The wear pad of claim 1, wherein the second surface region of the polyurethane pad comprises projections that are configured to mate with corresponding cavities of the grouser plate.

12. A wear pad adapted to be attached to a grouser plate for a track-type machine, comprising:
   a polyurethane pad having:

a first surface region that is adapted to engage a contact patch between the polyurethane pad and a ground region underneath the track-type machine, the first surface region having a first area, and a second surface region that is adapted to engage the grouser plate;

a unitary reinforcing member at least partially embedded within the polyurethane pad, the unitary reinforcing member having:

a third surface region on a first side of the unitary reinforcing member, wherein the third surface region faces the first surface region, the third surface region is in contact with polyurethane of the polyurethane pad, and a second area of the third surface region is greater than fifty percent of the first area, and a fourth surface region on a second side of the unitary reinforcing member opposite the first side, wherein the fourth surface region is in contact with the polyurethane of the polyurethane pad; and at least one first fastener associated with the unitary reinforcing member and adapted to engage at least one second fastener associated with the grouser plate so as to secure the second surface region of the wear pad to the grouser plate.

13. The wear pad of claim 12, wherein the second area is greater than sixty percent of the first area.

14. The wear pad of claim 12, wherein the second area is greater than seventy percent of the first area.

15. The wear pad of claim 12, wherein the second area is greater than eighty percent of the first area.

16. The wear pad of claim 12, wherein the at least one first fastener comprises at least one threaded stand-off fixedly attached to the unitary reinforcing member and at least partially embedded within the polyurethane of the polyurethane pad.

17. The wear pad of claim 12, in combination with the grouser plate, wherein:

the grouser plate has a first edge and a second edge that is shorter than the first edge, and at least one region of the polyurethane pad extends past the second edge.

18. The wear pad of claim 12, wherein a thickness of the polyurethane between the first surface region and the third surface region is substantially uniform.

19. The wear pad of claim 12, wherein the polyurethane of the polyurethane pad is bonded to at least one of the third surface region or the fourth surface region.

20. The wear pad of claim 12, wherein the polyurethane of the polyurethane pad is bonded to each of the third surface region and the fourth surface region.

21. The wear pad of claim 12, wherein the polyurethane of the polyurethane pad is chemically bonded to at least one of the third surface region or the fourth surface region.

22. The wear pad of claim 12, wherein the polyurethane of the polyurethane pad is chemically bonded to each of the third surface region and the fourth surface region.

23. The wear pad of claim 12, wherein the second surface region of the polyurethane pad comprises projections that are configured to mate with corresponding cavities of the grouser plate.

\* \* \* \* \*